United States Patent [19]
Pfeffer et al.

[11] Patent Number: 5,566,833
[45] Date of Patent: Oct. 22, 1996

[54] PRESSURE SORTER FOR FIBER SUSPENSIONS AS WELL AS A PROCESS FOR THE PREPARATION OF FIBER SUSPENSIONS

[75] Inventors: Jochen G. Pfeffer, Eningen; Erich Czerwoniak, Pfullingen, both of Germany

[73] Assignee: HermannFinckh Maschinenfabrik GmbH & Co., Pfullingen, Germany

[21] Appl. No.: 381,270

[22] Filed: Jan. 26, 1995

Related U.S. Application Data

[63] Continuation of Ser. No. 377,373, Jan. 25, 1995.

[51] Int. Cl.$^6$ .............................. B07B 1/04; B07D 21/02
[52] U.S. Cl. ........................... 209/273; 209/300; 210/413
[58] Field of Search ...................................... 209/273, 274, 209/281, 283, 300, 379, 385, 389; 210/413, 414, 415

[56] References Cited

U.S. PATENT DOCUMENTS

| | | | |
|---|---|---|---|
| 3,400,820 | 9/1968 | Nelson | 209/273 |
| 3,581,903 | 6/1971 | Holz | 210/415 |
| 3,680,696 | 8/1972 | Morin | 209/240 |
| 3,726,401 | 4/1973 | Bolton, III et al. | 209/240 |
| 3,912,622 | 10/1975 | Bolton, III et al. | 209/17 |
| 3,964,996 | 6/1976 | Holz et al. | 209/17 |
| 4,043,919 | 8/1977 | Hutzler | 210/407 |
| 4,155,841 | 5/1979 | Chupka et al. | 209/273 |
| 4,200,537 | 4/1980 | Lamort | 210/415 |

(List continued on next page.)

FOREIGN PATENT DOCUMENTS

| | | |
|---|---|---|
| 1156609 | 11/1983 | Canada . |
| 206975 | 12/1986 | European Pat. Off. . |
| 275921 | 7/1988 | European Pat. Off. . |
| 2264595 | 11/1975 | France . |
| 2526657 | 12/1976 | Germany . |
| 129814 | 2/1978 | Germany . |
| 2051600 | 1/1981 | United Kingdom .................. 209/273 |
| WO94/00634 | 1/1994 | WIPO . |

*Primary Examiner*—William E. Terrell
*Assistant Examiner*—Tuan Nguyen
*Attorney, Agent, or Firm*—Leydig, Voit & Mayer, Ltd.

[57] ABSTRACT

A pressure sorter for fiber suspensions, and a process for the preparation of fiber suspensions, are disclosed wherein a rotor is disposed concentrically within a cylindrical screen that has spaced circumferential rows of narrow through slots through which a portion of the fiber suspension fed into the screen passes radially outward to an accepts chamber external to the screen. The fraction of the suspension which does not pass through the screening slots passes axially out of the screen cylinder as a "rejects" flow. V-shaped grooves around the inflow ends of the screening slots create turbulences in the adjacent suspension material. The rotor includes external profiled elements which generate positive and negative pressure pulses at the adjacent inflow side of the screen as the rotor is rotated. Each profiled element has a front flank approximately parallel to the screen axis and a trailing flank which slopes radially inward of the screen, whereby the front flanks create pressure pulses in the fiber suspension adjacent the inflow ends of the screening slots and the trailing flanks cause suspension to be drawn back through the screen slots. To reduce the risks of cracking of the screen, the number and configuration of the profiled elements, the thickness of the screen, and the flow rates of the suspension through the pressure sorter are correlated such that throughput rates of the fiber suspension do not exceed $$V_{Gmax} = 32 \times F_f \times D/8, \text{ or}$$

$$V_{Smax} = 50 \times F_f \times D/8$$

where $V_{Gmax}$ is the rate of draw-off of the accepts portion in liters/min, $V_{Smax}$ is the total suspension supplied into the sorter in liters/min, $F_f$ is the sum of the projected area of the front flank sections located opposite the slot rows (in cm$^2$), D is the screen wall thickness in mm and 8 is a reference value in mm.

20 Claims, 11 Drawing Sheets

U.S. PATENT DOCUMENTS

| | | | |
|---|---|---|---|
| 3427390 | 2/1986 | Germany . | |
| 4,276,159 | 6/1981 | Lehman | 209/273 |
| 4,410,424 | 10/1983 | Chupka et al. | 209/273 |
| 4,529,520 | 7/1985 | Lampenius | 210/498 |
| 4,744,894 | 5/1988 | Gauld | 209/234 |
| 4,855,038 | 8/1989 | LeBlanc | 209/273 |
| 5,000,842 | 3/1991 | Ljokkoi | 209/273 |
| 5,110,456 | 5/1992 | LeBlanc | 209/273 |
| 5,147,543 | 9/1992 | Frejborg | 209/273 X |
| 5,192,438 | 3/1993 | Frejborg | 210/413 |
| 5,307,939 | 5/1994 | Young et al. | 210/415 X |
| 5,476,178 | 12/1995 | Lamort | 209/300 X |

PRESSURE SORTER FOR FIBER SUSPENSIONS AS WELL AS A PROCESS FOR THE PREPARATION OF FIBER SUSPENSIONS

This is a continuation of copending application 08/377,373 filed Jan. 25, 1995, pending.

BACKGROUND OF THE INVENTION

The invention relates to a pressure sorter for fiber suspensions, with a housing, in which a stationary screen rotationally symmetrical to a screen axis and having a wall thickness of approximately 6 mm to approximately 9 mm is arranged, this screen separating in the housing a supply chamber encircled by the screen from an accepts chamber located outside the screen, wherein an inflow side of the screen faces the supply chamber and the supply chamber and the accepts chamber communicate with one another via through channels located in the screen wall, wherein the through channels, when viewed radially from the supply chamber, are slots approximately parallel to the screen axis, these slots all having the same length as well as an inside or clear slot width measured in the circumferential direction of the screen of approximately 0.1 mm to approximately 0.25 mm and forming in the screen wall a plurality of rows of slots following one another in the circumferential direction of the screen, these rows extending in the circumferential direction of the screen and being arranged in spaced relation to one another in the direction of the screen axis, and wherein the inflow side of the screen includes contours generating-turbulences in the fiber suspension to be treated, as well as a rotor drivable by a motor about the screen axis, an inlet for the fiber suspension to be treated communicating with a first axial end of the supply chamber, an accepts outlet communicating with the accepts chamber and a rejects outlet communicating with a second axial end of the supply chamber, wherein for generating positive and negative pressure pulses in the fiber suspension to be treated the rotor has a plurality of profiled elements arranged in the supply chamber and following one another in the circumferential direction of the rotor, these profiled elements each having a first flank lying in front in the rotational direction as well as approximately parallel to the screen axis for driving the fiber suspension to be treated in the rotational direction of the rotor as well as a second flank lying behind the first flank in a direction opposite to the rotational direction for drawing liquid back from the accepts chamber through the screen and into the supply chamber.

The invention also relates to a process for the preparation of fiber suspensions with the aid of a pressure sorter of the aforementioned type.

In particular, the invention deals with the preparation of such fiber suspensions which are recovered from waste paper.

Pressure sorters of the aforementioned type are generally known. The profiled elements of the rotor can, for example, be freely extending profiled bars, each of which is connected via at least one arm extending approximately radially in relation to the screen axis to a central rotor hub which can rotate about the screen axis; a rotor of this type is disclosed by U.S. Pat. No. 4,410,424 in FIG. 1 as well as U.S. Pat. No. 4,155,841. The rotor can, however, also have a rotationally symmetrical casing about its axis of rotation or about the screen axis with profiled elements attached to its outer circumferential surface which are approximately wedge-shaped in cross section; rotors of this type are disclosed in the PCT application PCT/EP92/01393 published as WO 94/00634 (this corresponds to U.S. patent application Ser. No. 08/351,329) but also in U.S. Pat. Nos. 4,200,537 and 4,855,038. These publications also disclose the fact that the aforementioned, forwardly located first flanks of the profiled elements need not extend exactly parallel to the screen axis or the axis of rotation of the rotor but can also be slightly inclined in relation to this direction.

As already mentioned above, the invention deals with those pressure sorters, in which the through channels in the wall of the screen have the shape of slots which extend at least approximately parallel to the screen axis. Screens having such slot-shaped through channels are shown, for example, in U.S. Pat. Nos. 3,680,696 and 3,726,401.

To prevent the through channels of the screen becoming clogged, during operation of the pressure sorter, by fibers, fiber conglomerations or impurities which are contained in the fiber suspension to be treated, it has proven to be expedient to provide the side of the screen facing the supply chamber of the pressure sorter with such contours that these generate turbulences in the fiber suspension to be treated in cooperation with the profiled elements rotating in the supply chamber. Pressure sorters having a screen, the side of which facing the supply chamber is provided with recesses, into which the through channels open, and/or with elevations or projections for the purpose of generating such turbulences, are described and illustrated in U.S. Pat. Nos. 5,110,456, 4,855,038, 4,276,159 and 4,529,520 as well as in Canadian patent 1,156,609.

The disclosure of all the aforementioned publications is herewith made part of the disclosure of the present application by reference.

The operators of such pressure sorters now require from the producers ever greater throughput capacities of the pressure sorters (volumes of the fiber suspension which can be treated per unit of time). One possibility for increasing the throughput capacity of a pressure sorter is to increase the size of the so-called free, through surface area of the screen (the free, through surface area of the screen is to be understood as the sum of the inside cross-sectional areas of the through channels of all the screen openings of the screen), and a second possibility is to increase the rotational speed of the rotor. However, both measures have so far been subject to limits, namely for the following reasons: During operation of a pressure sorter, the wall of the screen cracks fairly often and therefore becomes unusable, and the occurrence of such cracks is attributed to the fact the screen is constantly exposed to the positive and negative pressure pulses or surges generated by the profiled elements of the rotor in the fiber suspension to be treated. Cracks naturally result in the screen wall due to these pressure pulses all the sooner, the greater the free, through surface area of the screen is, since an increase in the free, through surface area means that the areas of the screen wall remaining between the screen openings become ever smaller. Furthermore, cracks form in the screen wall all the sooner, the thinner the wall thickness of the screen is and the greater or stronger the positive and negative pressure pulses generated by the rotor are, and the strength of these pressure pulses increases with the rotational speed of the rotor. In this connection, it is to be noted that screen wall thicknesses of less than approximately 6 mm are insufficient in most cases and screen wall thicknesses of 10 mm and more lead to material and production costs which are hardly to be justified financially.

SUMMARY OF THE INVENTION

The basic concept of the present invention is now to be seen in the following: The higher the throughput capacity of a pressure sorter is, the greater the volume of the so-called accepted material which results at the accepts outlet of the pressure sorter per unit of time or can be drawn off from there (accepted material is to be understood as that part of the fiber suspension to be treated by the pressure sorter which can pass through the screen openings, in other words the through channels of the screen connecting the two screen sides with one another). The first flanks of the profiled elements lying in front in the rotational direction now drive or urge the fiber suspension to be treated, which is located in the supply chamber of the pressure sorter, in the rotational direction of the rotor so that the rotational speed of the fiber suspension to be treated along the screen side facing the supply chamber, i.e. along the inflow or inlet side of the screen, is at least almost as great as the rotational speed of the profiled elements of the rotor. Since the distance of the rotor profiled elements from the inflow side of the screen measured radiallly to the screen axis is relatively small (e.g. 5 mm), the first flanks of the rotor profiled elements lying in front in the rotational direction deflect the fiber suspension to be treated, during acceleration thereof, in a direction towards the screen inlet side. The hydraulic forces exerted on the screen by those parts of the fiber suspension to be treated which are deflected in this manner are all the greater, given a predetermined throughput capacity of the pressure sorter or a predetermined accepts volume resulting per unit of time, the fewer profiled elements the rotor has, since in the case of a rotor having few profiled elements each profiled element must deflect with its forwardly located first flank per unit of time a greater volume of the fiber suspension to be treated in a direction towards the screen inlet side than in the case of a rotor having a greater number of profiled elements. For this reason, it is suggested, in principle, with the present invention that the rotor be provided with such a number of profiled elements that the volume of the fiber suspension to be treated which is to be processed by each profiled element per unit of time is limited to a maximum, the value of which is below that at which the screen is damaged by the hydraulic forces.

It has now become apparent that cracks in the wall of a screen of a pressure sorter of the type mentioned at the outset do not occur when the rotor has so many profiled elements that the accepts volume $V_{Gmax}$ (in liters) drawn off per minute at the accepts outlet of the pressure sorter during its operation is at the most approximately $$V_{Gmax} = 32 \times F_f \times D/8$$

where D means the screen wall thickness (in mm), 8 is a reference thickness value expressed in mm whereby D/8 is a dimensionless factor refleccting the relative wall thickness $F_f$ is the sum of the surface area (in cm$^2$), measured perpendicular to the circumferential direction of the rotor, of those sections of the first flanks of all the profiled elements which are located opposite the rows of slots in a radial direction in relation to the screen axis, and 32 is a ratio of the accepts volume rate of flow (liters/minute) to the noted surface area (cm$^2$) and therefore has the dimensions of liters/min/cm$^2$ i.e.

$$V_{Gmax} = 32 \times F_f \times \frac{D}{8} \quad \frac{\text{liters}}{\text{min} \times \text{cm}^2}$$

If the definition of the invention is not related to the accepts volume resulting per unit of time but to the volume of fiber suspension to be treated which is supplied to the pressure sorter per unit of time, the invention can be defined such that in a pressure sorter of the type mentioned at the outset the rotor has such a number of profiled elements that the volume $V_{Smax}$ (in liters) of fiber suspension to be treated which is supplied per minute to the pressure sorter during its operation via its inlet is at the most approximately $$V_{Smax} = 50 \times F_f \times D/8$$

where D means the screen wall thickness (in mm) and, 8 is a reference value as referred to above, $F_f$ is the sum of the surface area (in cm$^2$), measured perpendicular to the circumferential direction of the rotor, of those sections of the first flanks of all the profiled elements which are located opposite the rows of slots in a radial direction in relation to the screen axis, and 50 is a ratio of the volume rate of flow of the fiber suspension to be treated to the noted surface area and therefore has dimensions as referred to above.

The value $F_f$ is, of course, not only dependent on the number and height of profiled elements but also on the length of the profiled elements measured in the direction of the screen or rotor axis as well as the length of the slot-shaped through channels measured in the direction of the screen or rotor axis and the number of rows of slots. The surface area, measured perpendicular to the circumferential direction of the rotor, of the first flank of a profiled element lying in front in the rotational direction is the surface area of the perpendicular projection of this flank onto a diametral plane containing the screen or rotor axis and bordering directly on this first flank.

In the case of a rotor having a casing rotationally symmetrical to the screen or rotor axis and profiled elements arranged on its outer circumferential surface, these profiled elements can extend in the direction of the screen or rotor axis over the entire axial length of the screen area provided with screen openings so that each individual profiled element extends continuously and free of steps over this axial length; as shown by WO 94/00634 or U.S. patent application Ser. No. 08/351,329, each individual profiled element can, however, also be formed by a plurality of sections which adjoin one another in axial direction but are offset relative to one another in circumferential direction of the rotor or screen. In a modification of the embodiment shown in WO 94/00634, a gap can, however, be located between the two sections of a profiled element (in axial direction) which then merely makes it necessary for a section or area of the adjacent profiled element to follow this gap in a direction opposite to the rotational direction of the rotor.

Preferred embodiments of the inventive pressure sorter or of the process to be carried out with such a pressure sorter for the preparation of fiber suspensions will now be described in the following.

In the case of pressure sorters, in which the length, measured in the direction of the screen or rotor axis, of the area of the rotor effective for the sorting process is greater than approximately 60 cm, it is recommendable for the profiled elements to be divided in axial direction into a plurality of sections and for the sections of a profiled element to be offset relative to one another in circumferential direction of the rotor, as illustrated in FIG. 5 of WO 94/00634.

To prevent the ends or ports of the screen openings or screen through channels on the inlet side becoming clogged during operation of a pressure sorter by fibers, fiber conglomerations and/or impurities contained in the fiber suspension to be treated, it is necessary to draw liquid out of the accepts chamber through the screen openings and back into the supply chamber with sufficient force with the aid of the rotor profiled elements. Since the quantity of liquid drawn back by each rotor profiled element is dependent inter alia on the second flank of the profiled element lying behind the first flank in a direction opposite to the rotational direction, namely on the length of this flank measured in rotational direction as well as the inclination of this flank in relation to the rotational direction, the length of this second flank may not be too small; the length of the profiled element measured in rotational direction will, however, be essentially determined by the length of its second flank measured in rotational direction. The inclination of this second flank in relation to the rotational direction is determined essentially by the ratio of the height of the profiled element to the length of its second flank measured in rotational direction (the height "H" of a profiled element is hereby to be understood as the height, measured in radial direction in relation to the rotor or screen axis, of the first flank of the profiled element lying in front in rotational direction). The greater the length "L" of the second flank of a rotor profiled element measured in rotational direction is, the fewer profiled elements the rotor can, however, have. It has become apparent that not only damage to the screen but also clogging of the screen openings can be avoided in an inventive pressure sorter, in particular, when the ratio L/H is approximately 7 to approximately 45, preferably approximately 7 to approximately 30, even better approximately 10 to approximately 25, better still approximately 15 to approximately 20 and best of all approximately 17 to approximately 18. Particularly good results can be achieved with a length "L" of approximately 200 to approximately 450 mm and a height "H" of approximately 10 to approximately 30 mm, and preferred is a length "L" of approximately 300 mm and a height "H" of approximately 17 mm.

In preferred embodiments of the inventive pressure sorter, the first flanks of the rotor profiled elements lying in front in rotational direction are plane, straight and at least approximately perpendicular to the circumferential direction of the rotor when the rotor circumference with profiled elements is projected onto a plane, as is the case, for example, in the illustration of FIG. 5 in WO 94/00634.

It has proven to be particularly favorable for the ratio $V_{Gmax}/F_f$ divided by the value D/8 to be approximately 20 to approximately 28 liters/min per cm². With reference to the amount of fiber suspension to be treated which is to be supplied to the pressure sorter, it is recommendable for the ratio $V_{Smax}/F_f$ divided by the value D/8 to be selected such that the proportion of rejected material in the fiber suspension to be treated in the pressure sorter, i.e. that part of the fiber suspension to be treated which cannot pass through the screen openings, is taken into consideration. Since the proportion of rejected material, relative to the fiber suspension to be treated, is customarily approximately 10% to approximately 35%, a value of approximately 34 results from the above for the ratio $V_{Smax}/F_f$ divided by the value D/8, with a proportion of rejected material of 10% for this figure; with a proportion of rejected material of 35% for this figure a value of approximately 50 results and for proportions of rejected material between the percentages given above corresponding intermediate values for the ratio $V_{Smax}/F_f$ divided by the value D/8.

The inventive process is preferably carried out with such rotational speeds of the rotor that the circumferential speed of the rotor profiled elements is approximately 10 to approximately 40 m/sec, preferably approximately 15 to 30 and, in particular, approximately 18 to approximately 26 m/sec.

Particularly high throughput capacities with good operational behavior of the pressure sorter can be achieved when the distance of the rotor profiled elements from the inflow side of the screen, measured in radial direction in relation to the rotor or screen axis, is a few millimeters; since, however, the screen wall produced from stainless sheet steel can, once a screen rotationally symmetrical to the screen axis has been formed from it, deviate from the exactly rotationally symmetrical form by approximately 1 mm to approximately 2 mm (measured in radial direction) along the screen circumference, a radial distance between the rotor profiled elements and the inflow side of the screen of at least somewhat more than 2 mm is recommended (average value measured over the screen circumference); on the other hand, the average value of this radial distance should not be more than approximately 20 mm as, otherwise, the desired effects of the rotor on the inlet side of the screen are too slight. Particularly preferred is an average radial distance of approximately 5 mm.

In order to avoid disturbing imbalances of the rotor at the relatively high rotational speeds of the rotor, the rotor must have at least two profiled elements in each axial rotor section acting on the screen. When considering such an axial rotor section, the maximum number of the profiled elements present in this rotor section depends on the rotor diameter, the length "L" defined in the above as well as the length, measured in circumferential direction of the rotor, of a gap which is possibly present between profiled elements following one another in circumferential direction of the rotor (the greater the length "L" and/or the length of the gap is, the fewer profiled elements can be accommodated in such an axial rotor section). In order not only to provide an adequate number of profiled elements to avoid damage to the screen but also to avoid clogging of the screen openings due to too small a length "L", it is recommendable for the ratio "L"/D to be selected such that it is at least approximately 0.2 and at the most approximately 1.0 (where "D" is the diameter defined by the edges of the profiled elements rotating about the rotor axis and lying closest to the rotor axis). It is particularly advantageous for the maximum value of the ratio L/D to be approximately 0.9, even better approximately 0.8.

In order to ensure a high durability of the screen at justifiable production costs, the thickness of the screen wall is preferably approximately 8 mm.

As already mentioned, a screen is all the more susceptible to the occurrence of cracks, the greater its free, through surface area is (for the following, as is customary in pressure sorters, the free, through surface area is defined as follows: Ratio of the sum of the inside cross-sectional surface areas of all the screen openings to the entire surface area of the inflow side of the screen, expressed in %, where this value is calculated only for those areas of the screen wall, in which screen openings are located). In the case of inventive pressure sorters having screen through channels in the form of slots extending parallel to the screen axis, it has proven to be particularly advantageous for the free, through surface area to be approximately 1% to approximately 10%.

BRIEF DESCRIPTION OF THE DRAWINGS

Additional features, advantages and details of the invention result from the following description of particularly advantageous embodiments of the inventive pressure sorter on the basis of the attached drawings; in the drawings.

DESCRIPTION OF THE ILLUSTRATED PREFERRED EMBODIMENT

Figure 1:
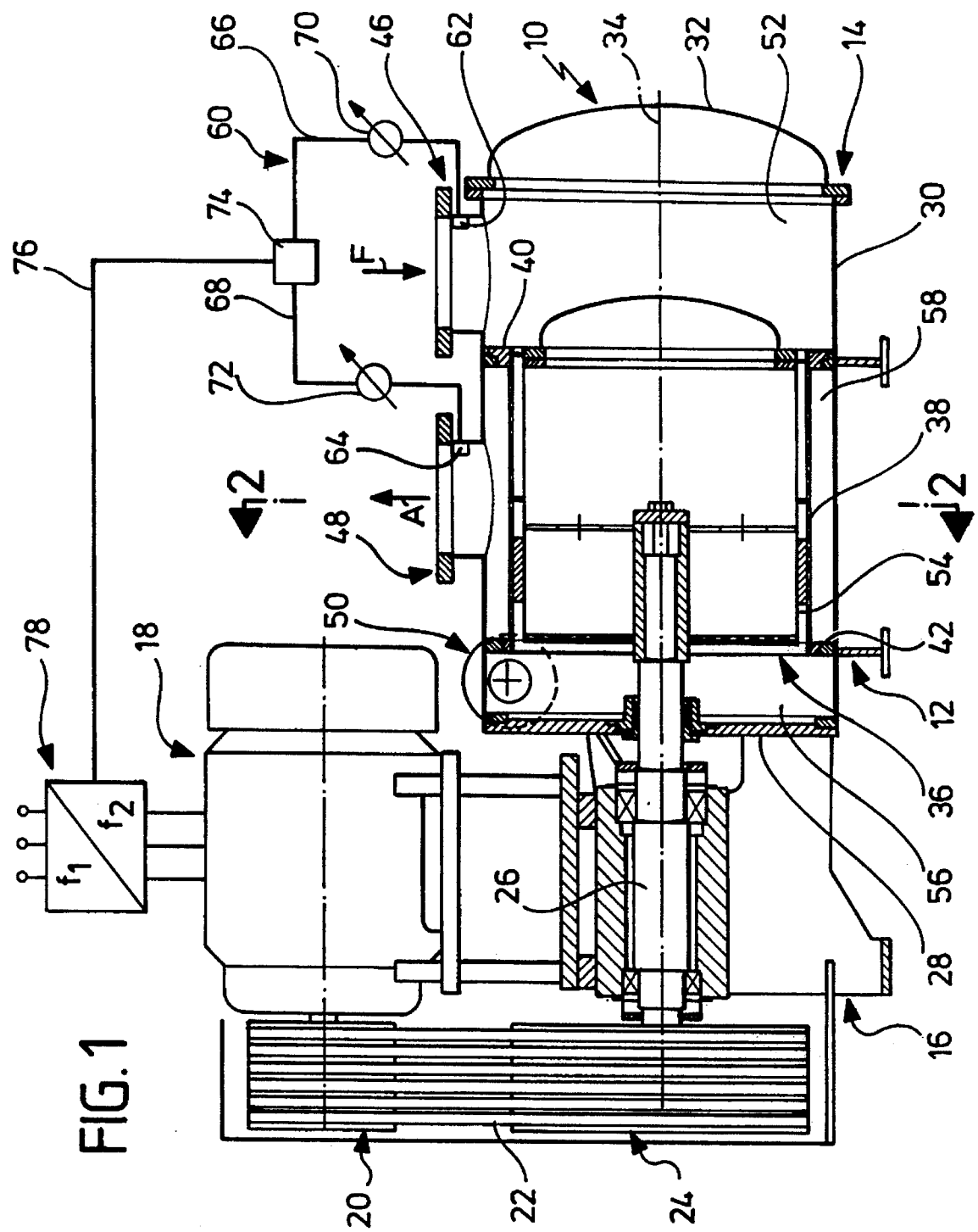
FIG. 1 shows an inventive pressure sorter partially in a side view and partially in section, the sectional illustration being a section in a vertical plane of diameter of the rotor or screen.

The actual pressure sorter 10 illustrated in FIG. 1 and having a housing 14 resting on supports 12 also has a motor 18 standing on a frame 16; this motor is a rotary current or three-phase A.C. motor which drives a belt pulley 24 by means of a belt pulley 20 on the motor and V-belts 22, the belt pulley 24 being fixed to a rotor shaft 26 rotatably mounted in the frame 16 as well as in the housing 14.

The housing 14 essentially consists of a front wall 28 to the left according to FIG. 1, a circular cylindrical housing shell 30 arranged concentrically to the rotor shaft 26 as well as a housing lid 32 which are connected with each other so as to be pressure-tight. An axis of the pressure sorter which is also the axis of the rotor shaft 26 has been designated as 34.

The rotor shaft 26 guided through the front wall 28 in a pressure-tight manner bears a rotor designated as a whole as 36 which is drivable about the axis 34 with the aid of the rotor shaft 26 and is surrounded by a circular cylindrical screen 38 which is concentric to the axis 34, is attached to two circular ring-shaped housing elements 40 and 42 fixed to the housing shell 30 and is thus held by these housing rings.

In the illustrated embodiment, the axial length (in the direction of the axis 34) of the rotor 36 is equal to the axial length of the operative region of the screen 38 between the housing rings 40 and 42. It would, however, also be possible to select the axial length of the rotor 36 so as to be greater or smaller than the axial length of the screen 38 in order to achieve specific effects.

An intake connecting pipe 46 is provided at the right end of the housing 14 according to FIG. 1 and—as indicated by the arrow F—the fiber suspension to be prepared or to be sorted is conveyed into the pressure sorter through this intake connecting pipe, namely by means of a pump which is not illustrated. An outlet connecting pipe 48 is attached to the housing shell 30 approximately in the middle above the screen 38 and the so-called accepted material—as indicated by the arrow A—exits the pressure sorter through this outlet connecting pipe. The accepted material is that part of the fiber suspension which has passed through the screen 38. Finally, a second outlet connecting pipe 50 is attached to the left end of the housing shell 30 according to FIG. 1 and the so-called rejected material—as indicated by the arrow R in FIG. 2—exits the pressure sorter through this outlet connecting pipe; the rejected material is that part of the fiber suspension to be prepared which cannot pass through the screen 38.

Figure 2:
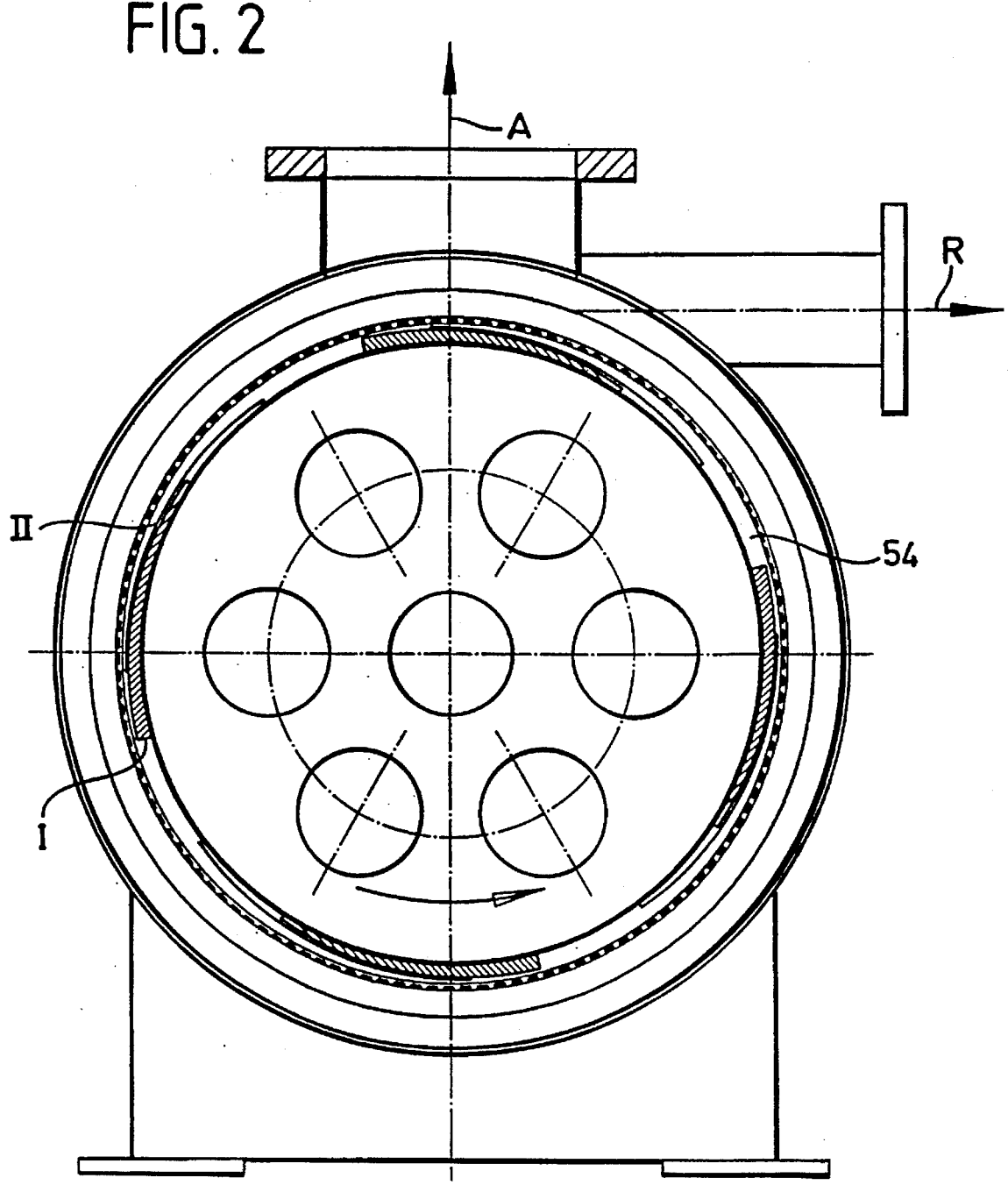
FIG. 2 is a section along the line 2—2 in FIG. 1.

Contrary to the illustration in FIG. 1, the intake connecting pipe 46 will be expediently arranged such that the fiber suspension to be sorted flows approximately tangentially into the housing 14, in the same way as the outlet connecting pipe 50 for the rejected material is aligned tangentially (see FIG. 2). In addition, the outlet connecting pipe 48 could, of course, also be arranged at the bottom of the housing shell 30, insofar as the arrangement of the pressure sorter 10 allows for the drainage of accepted material downwards.

The fiber suspension to be prepared which is fed into the pressure sorter 10 via an intake connecting pipe 46 passes first of all into an intake chamber 52 and it then enters an annular chamber between the circumference of the rotor 36 and the screen 38 which is designated in the following as supply chamber 54, and the fiber suspension to be sorted enters the latter via a first axial end 54a of this supply chamber. As a result of the rotor 36 rotating about the axis 34 as well as, if necessary, the tangential alignment of the intake connecting pipe 46 and due to the pressure, under which the fiber suspension to be sorted is conveyed into the pressure sorter 10, the fiber suspension flows in a helical line through the supply chamber 54 from its first end 54a to its second end 54b, whereby a portion of the fiber suspension passes through openings or apertures of the screen 38 and thus reaches the accepts chamber 58. The rejected material leaves the supply chamber 54 at its second end 54b and thus reaches the rejects chamber 56, from which the rejected material leaves the pressure sorter via the second outlet connecting pipe 50.

In preferred embodiments of the inventive pressure sorter, the axis 34 extends at least approximately horizontally; fundamentally, it would also be conceivable, however, to assemble the pressure sorter such that its axis 34 extends at least approximately vertically.

Due to the relatively small openings of the screen 38, a pressure difference results between supply chamber 54 and accepts chamber 58, in fact the pressure in the accepts chamber is lower than in the supply chamber. In order to detect this pressure difference, a measuring device 60 is provided according to the invention and this comprises a first pressure transmitting means 62 and a second pressure transmitting means 64 which are arranged in the intake connecting pipe 46 and the first outlet connecting pipe 48, respectively, but could, however, also be arranged in the intake chamber 52 and the accepts chamber 58, respectively. They are connected with the inputs of a difference forming device 74 via lines 66 and 68, in which indicating devices 70 and 72 are arranged. This difference forming device delivers at its output a control signal proportional to the pressure difference, this signal being applied to the control input of a frequency converter 78 via a line 76. This converter is supplied by a current source not illustrated with a three-phase alternating current or rotary current having the frequency $f_1$ and delivers a three-phase alternating current having the frequency $f_2$ for driving the three-phase A.C. current motor 18, whereby the frequency $f_2$ is a function of the control signal generated by the difference forming device 74. In this manner, the rotor 36 is driven with a rotational speed which is a function of this control signal and, therefore, of the pressure difference between supply chamber 54 and accepts chamber 58. Instead of the indicating devices 70 and 72 or in addition to these, potentiometers or other regulating elements could also be provided in the lines 66 and 68, the signals delivered by the pressure transmitting means 62 and 64 being changeable by these regulating elements in order to be able to influence the dependence of the control signal applied to the line 76 on the mentioned pressure difference.

Figure 3:
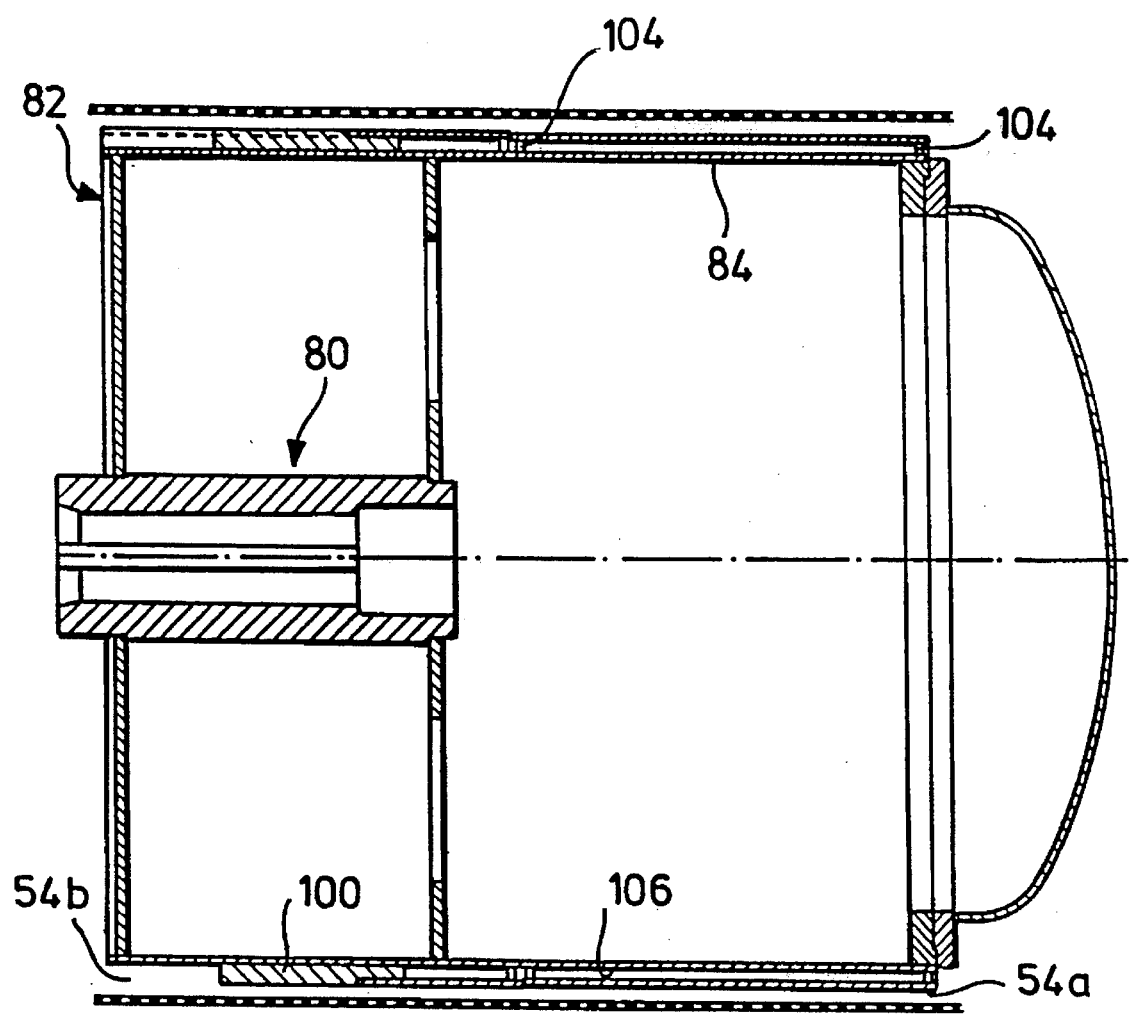
FIG. 3 shows a screen illustrated only schematically and the rotor of the pressure sorter shown in FIG. 1, but on a larger scale than in FIG. 1 and taken generally as a section along line 3—3 of FIG. 4.
Figure 4:
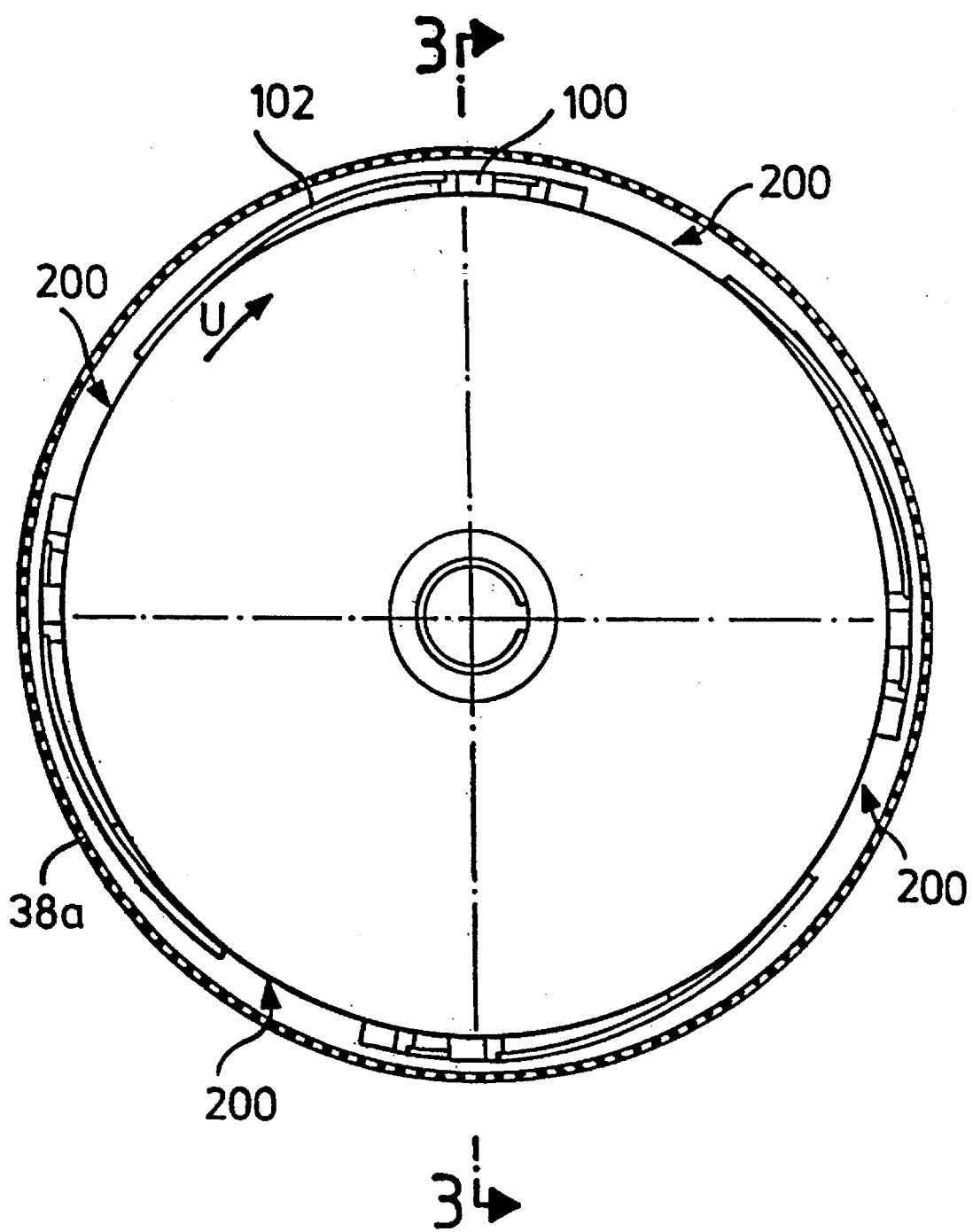
FIG. 4 is a front view of the rotor, seen from the left according to FIG. 1, and together with a screen illustrated in an axial section, even though only schematically.
Figure 5:
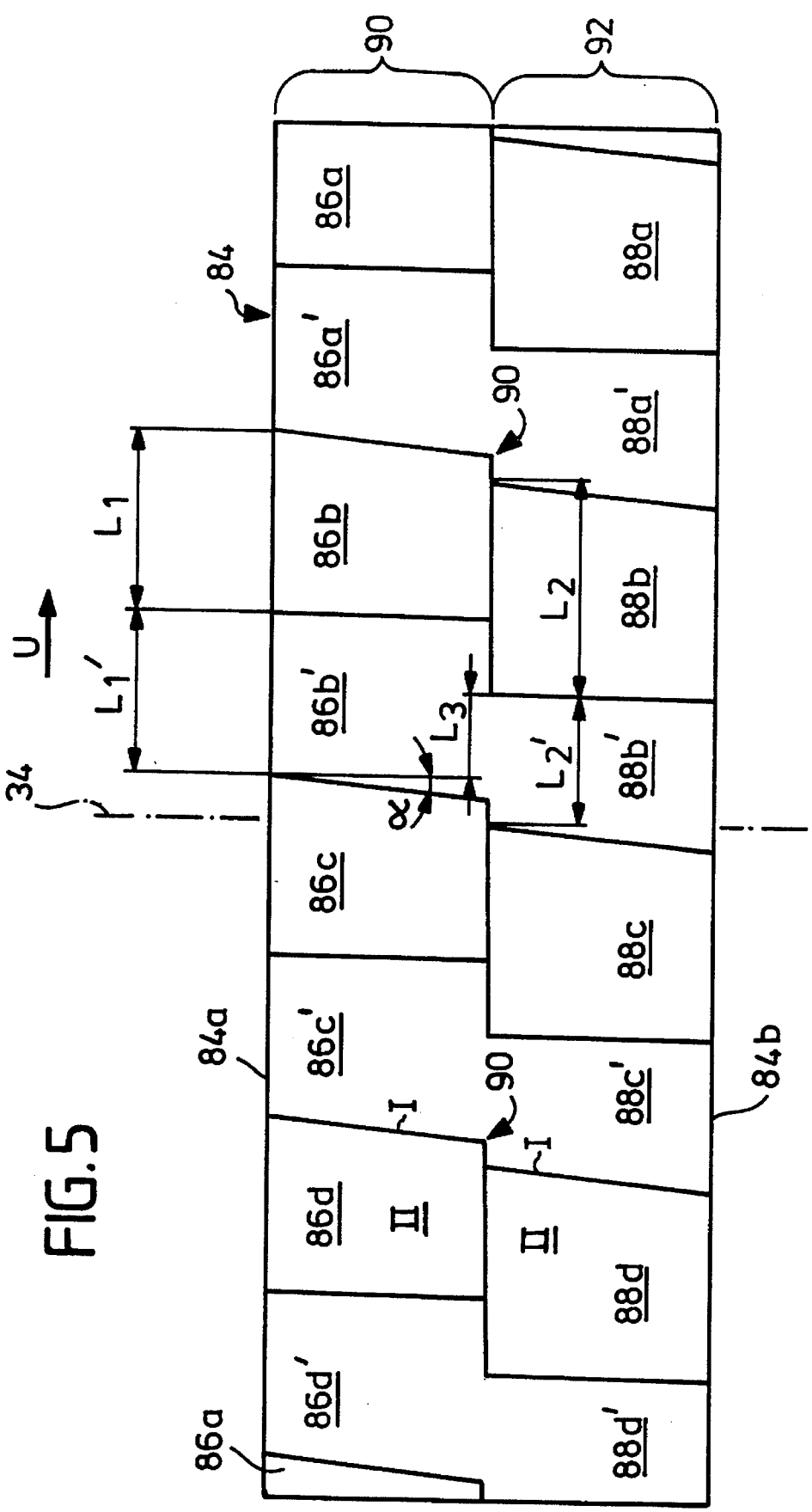
FIG. 5 shows a layout of the rotor circumference, i.e. a plan view of the entire circumferential surface of the rotor which has, however, been illustrated unroller or flattened into one plane.

On the basis of FIGS. 3 to 5, the design of one embodiment of the rotor 36 is now to be explained in detail.

A hub 80 fixedly connected to the rotor shaft 26 bears a closed, hollow, circular cylindrical rotor body 82 with a circular cylindrical rotor casing 84. This has a first axial end 84a at the first axial end 54a of the supply chamber 54 and a second axial end 84b at the second axial end 54b of the supply chamber and bears two sets of profiled elements on the outside, namely a first set which is formed by profiled elements 86a, 86b, 86c and 86d as well as a second set formed by profiled elements 88a, 88b, 88c and 88d. The first set of profiled elements forms a first row of profiled elements extending in circumferential direction of the rotor or rotational direction U of the rotor with gaps 86a', 86b', 86c' and 86d' arranged between these elements, and this row defines a first axial rotor section 90 which faces, i.e. is adjacent to, the intake chamber 52; the second set of profiled elements 88a–88d forms a second, identical row of profiled elements and gaps 88a', 88b', 88c' and 88d' arranged therebetween, and this second row defines a second axial rotor section 92 which is adjacent to the rejects chamber 56. In the illustrated preferred embodiment, all the profiled elements are of the same length (measured in the direction of the axis 34); depending on the desired sorting result and/or as a function of the type of fiber suspension to be sorted, it could be expedient, however, to select the length of the first row so as to be greater or smaller than the length of the second row. In addition, it can be expedient to provide the rotor with more than two such rows.

As is shown particularly in FIGS. 2, 4 and 5, each profiled element has a front surface or first flank I lying in front in the rotational direction U and extending perpendicular to the circular cylindrical outer circumferential surface of the rotor casing 84 and, therefore, to the surface of the gap lying in front thereof in rotational direction U, as well as a rear surface or second flank II directly adjoining the first flank I, this second flank sloping downwards and inwardly in radial direction contrary to the rotational direction U and, therefore, towards the axis 34 so that the profiled elements have in the section perpendicular to the axis 34 a cross section resembling a very acute-angled triangle which has been bent concentrically to the axis 34. Strong positive pressure pulses and strong turbulences are generated in the supply chamber 54 by the first flanks I; in addition, the fiber suspension in the supply chamber 54 is greatly accelerated by the first flanks I, namely at the most up to the rotational speed of the profiled elements. On the other hand, the downwardly sloping second flanks II generate negative pressure pulses, by means of which liquid is drawn back from the accepts chamber 58 through the screen openings and into the supply chamber 54. Particularly strong turbulences result in the supply chamber 54 due to the flow component of the fiber suspension directed in rotational direction U when the inner side of the screen 38 is designed in the known manner so as to be "rough", i.e. profiled.

According to the invention, the first flanks I do not extend parallel to the axis 34 in preferred embodiments of the inventive pressure sorter but form an acute angle a with the direction of the axis 34, in fact the flanks I are inclined in relation to the direction of the axis 34 such that the flow component of the fiber suspension in the supply chamber 54 extending in the direction of the axis 34 is increased in the direction from the first axial end 54a of the supply chamber to its second axial end 54b.

As is apparent from FIG. 5, the profiled elements 86a–86d of the first row in the illustrated preferred embodiment are shorter—measured in circumferential direction of the rotor or rotational direction U—than the profiled elements 88a–88d of the second row. This measure serves the purpose of adapting the effect of the profiled elements to the different consistency of the fiber suspension, the consistency of which increases in the supply chamber 54 from its first end 54a to its second end 54b. In the particularly advantageous embodiment illustrated in FIG. 5, each of the profiled elements 86a–86d of the first row extends over a circumferential angle of 45° (this is the maximum length $L_1$ of the profiled elements), whereby the length of the profiled elements decreases towards the second axial end 84b of the rotor casing 84 because the first flanks I extend at an angle to the direction of the axis 34 while the rear edges of the second flanks II are aligned parallel to the axis 34. The shortest length $L_1'$ of the gaps 86a'–86d' of the first row is also 45° and, therefore, is equal to the greatest length $L_1$ of the profiled elements of this row, whereby the length of the gaps in the direction towards the second axial end 84b of the rotor casing 84 increases.

The maximum length $L_2$ of the profiled elements 88a–88d of the second row is 53° in this embodiment; since, according to the invention, the number of profiled elements of the second row equals the number of profiled elements of the first row, a lower value of 37° results here for the minimum length $L_2'$ of the gaps 88a'–88d' of the second row.

As is likewise shown in FIG. 5, the profiled elements 88a–88d of the second row and, therefore, their gaps are offset in relation to the profiled elements of the first row or their gaps contrary to the rotational direction U. The magnitude of this offset or displacement is adjusted to the lengths of the profiled elements or the gaps such that gaps of the two rows which are adjacent to each other in axial direction overlap each other to such an extent in the rotational direction U, i.e., in the circumferential direction of the rotor, that they form a through channel in the axial direction which extends from the one axial end 84a of the rotor casing 84 as far as its other axial end 84b. In the embodiment illustrated in FIG. 5, the inside width $L_3$ of this channel is 25°, wherein the inside width is to be understood as that width which the viewer sees in a front view of the rotor, in the direction of the axis 34.

In the illustrated preferred embodiment, the lengths of the profiled elements of the first row are approximately equal to the lengths of the gaps of the first row, the lengths of the profiled elements of the second row are greater than the lengths of the profiled elements of the first row, and the lengths of the gaps of the second row are smaller than the lengths of the profiled elements of the second row and smaller than the lengths of the gaps of the first row.

Due to the inventive arrangement of the profiled elements of the two rows steps 90 result, by means of which the following effect is achieved: Accumulations of fibers and impurities which can occur at the first flanks I of the profiled elements 86a–86d of the first row, slide along the first flanks I of the profiled elements of the first row in the direction towards the second axial end 54b of the supply chamber 54 due to the axial flow component of the fiber suspension in the supply chamber 54 and thereby reach the steps 90, in the region of which they are broken up due to the strong turbulences prevailing there and are mixed with the fiber suspension—accumulations of fibers and impurities at the first flanks I of the profiled elements 88a–88d of the second row are also transported in axial direction and reach the rejects chamber 56.

Hereinabove, the lengths of the profiled elements and the gaps have been expressed in circumferential angles. In the practical realization of the inventive pressure sorter, the lengths $L_1$ and $L_2$ lie within a range of between approximately 200 mm and approximately 450 mm.

The circumferential speeds of the rotor achieved by the adjustment of the rotational speed of the rotor are expediently between approximately 10 m/s and approximately 40 m/s, whereby the best sorting results are generally achieved with circumferential speeds of approximately 15 to approximately 30 m/s.

Circumferential speeds of the rotor of approximately 15 to approximately 40 m/s are preferred, and slot-shaped screen openings having an inside width, measured in circumferential direction of the screen, of approximately 0.1 mm to approximately 0.25 mm are recommended in this case.

The construction of the profiled elements 86a–86d or 88a–88d of the illustrated preferred embodiment perhaps is best seen in FIGS. 3 and 4. Each of these profiled elements consists—when the rotor casing 84 is disregarded—of a strip 100 forming the first flank I, a curved metal sheet 102 forming the second flank II and two side walls 104, whereby with reference to FIG. 3 it is to be noted that in this Figure, due to the sloped course of the first flanks I and, therefore, the strips 100, the latter have not been cut perpendicular to their longitudinal extension but at an angle thereto. The cavities 106 of the profiled elements enclosed by the rotor casing 84, the strips 100, the metal sheets 102 and the side walls 104 are intended to be liquid-tight or filled with a filling material, such as, for example, a foamed plastic, in order to prevent imbalances resulting in the rotor. The same applies to the cavity of the rotor body 82.

Finally, it is to be noted that the channels with the inside width $L_3$ can be seen particularly clearly in FIG. 4 and are designated as 200.

Since the design of one embodiment of the rotor of the inventive pressure sorter has been described in detail on the basis of FIGS. 2–5, the rotor embodiment according to FIGS. 6–8 will be described in the following only insofar as this differs from the first rotor embodiment shown in the FIGS. 2–5.

Figure 6:
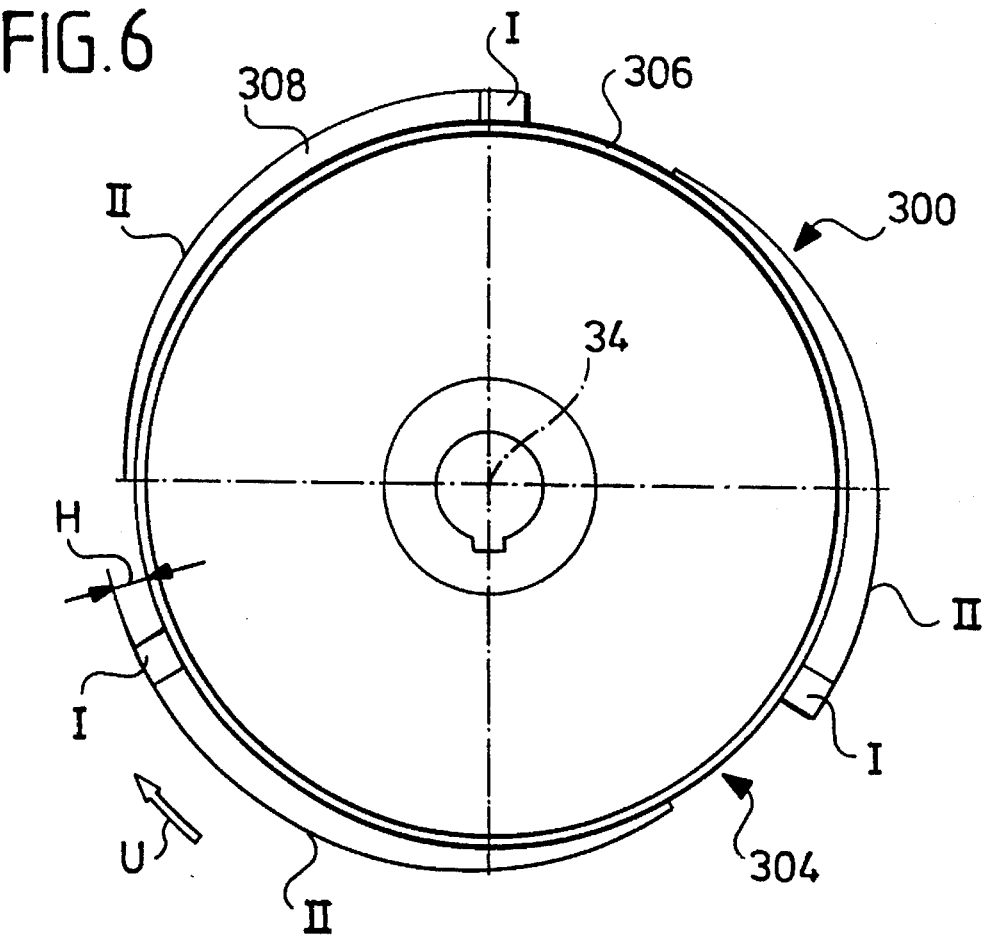
FIG. 6 shows a second preferred embodiment of the rotor of the inventive pressure sorter, namely a front view of the rotor seen from the left according to FIG. 1.
Figure 7:
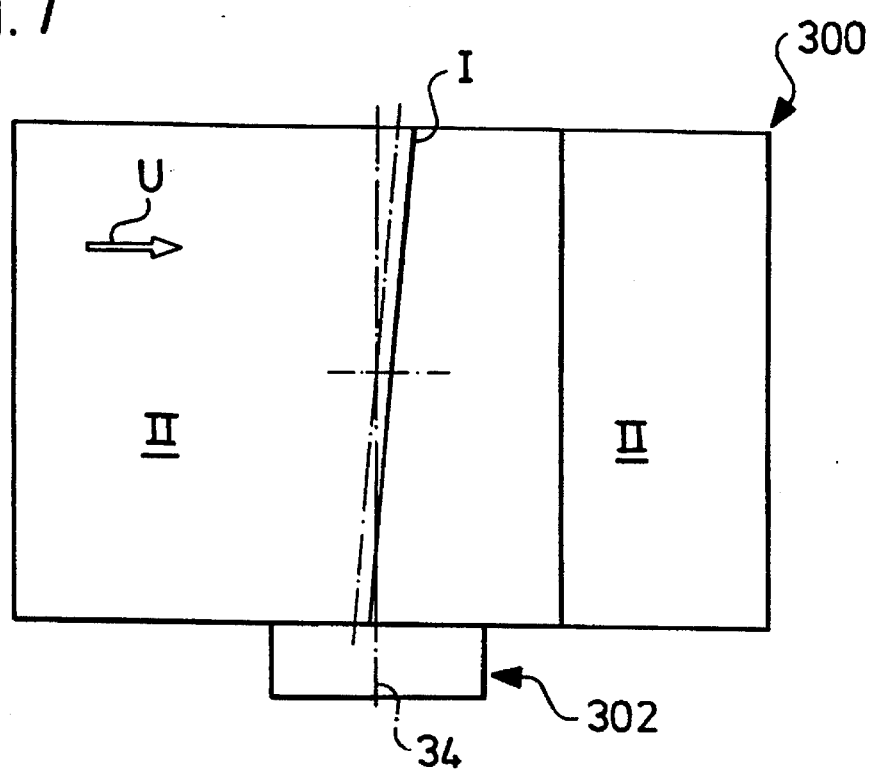
FIG. 7 is a side view of the rotor illustrated in FIG. 6, seen perpendicular to the rotor axis.
Figure 8:
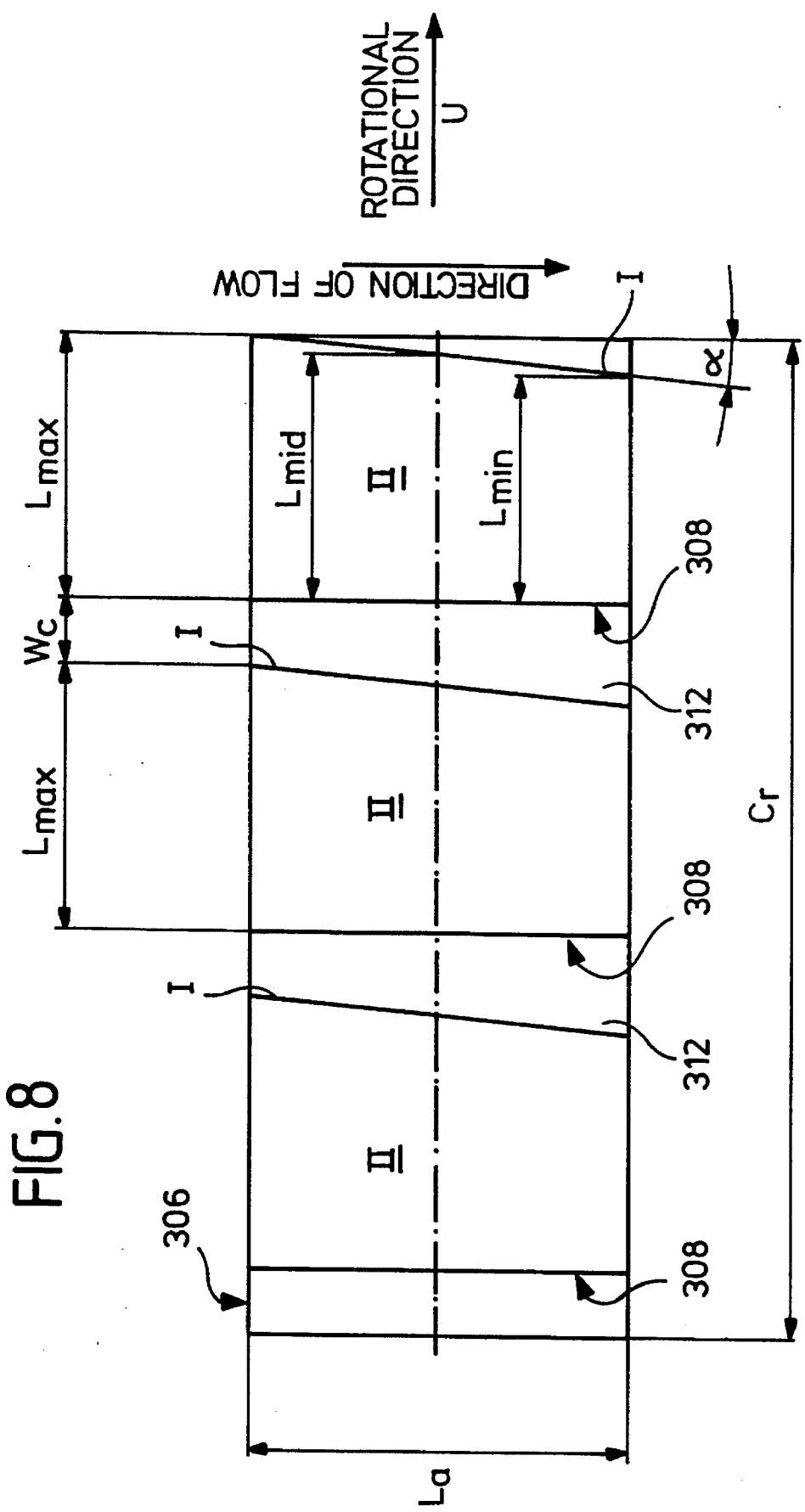
FIG. 8 is an illustration corresponding to FIG. 5 of the rotor according to FIGS. 6 and 7.

The rotor illustrated in FIGS. 6–8 and designated as a whole as 300 has a hub 302 which is to be securely connected to the rotor shaft 26 illustrated in FIG. 1 and bears a closed, hollow, circular cylindrical rotor body 304 having a circular cylindrical rotor casing 306. The rotational direction of the rotor has again been indicated by an arrow U. As in FIGS. 1–5, the rotor axis has been designated as 34. Three profiled elements 308 of an identical design are secured to the rotor casing 306, each of these profiled elements having a front surface or first flank I lying in front in rotational direction U and extending perpendicular to the circular cylindrical, outer circumferential surface of the rotor casing 306. Moreover, each profiled element 308 has a rear surface or second flank II which directly adjoins the first flank I and slopes downwardly and inwardly in radial direction (in relation to the rotor axis 34) contrary to the rotational direction U and, therefore, towards the axis 34 so that the profiled elements 308 have in the section perpendicular to the axis 34 a cross section resembling a very acute-angled triangle which has been bent concentrically to the axis 34.

If the rotor illustrated in FIGS. 6–8 is combined with a screen, as illustrated in FIGS. 9–12, in which only approximately 50% of the overall surface of the screen wall is provided with slot-shaped through channels, i.e., the axially spaced rows 502 of slots 500, the sum $F_f$ of the surface area of the sections of flanks I of the three rotor profile elements 308 illustrated in FIGS. 6–8 which overlie the slots 500 of the slot rows 502 is approximately 50% of three times the surface area of one of the flanks I, wherein each such flank surface area is to be measured as the area of the projection of the flank I normal to and onto a plane extending perpendicular to the rotational direction U and perpendicular to the plane of drawing in FIG. 8, namely with the layout of the rotor circumference illustrated in FIG. 8, i.e. on the assumption that the outer circumferential surface of the rotor casing 306 forms a plane.

With the rotor according to FIGS. 6–8, the height "H" of the first flank I of each of the profiled elements 308, is intended to be 17 mm, measured in a radial direction in relation to the rotor axis 34, as represented in FIG. 6. The maximum length "$L_{max}$" of each second flank II, measured in rotational direction U, is intended to be approximately 307 mm, the minimum length "$L_{min}$" approximately 268 mm, with a mid-length "$L_{mid}$" of approximately 287.5 mm, whereby that side of the profiled elements 308 where the length "L" is the longest is intended to face the intake chamber 52 of the pressure sorter shown in FIG. 1. Gaps or channels 312 are located on the rotor casing 306 between the profiled elements 308 and the smallest width $W_c$ of these channels, measured in rotational direction U, is intended to be approximately 76 mm (about 23.9°). As is apparent from FIG. 8, the flanks I are, finally, inclined at an angle α of approximately 5° in relation to a direction perpendicular to the rotational direction U and located in the plane of drawing of FIG. 8, and such that the greatest length of the second flank II of each profiled element 308, measured in rotational direction U, faces the intake chamber 52 shown in FIG. 2.

Figure 12:
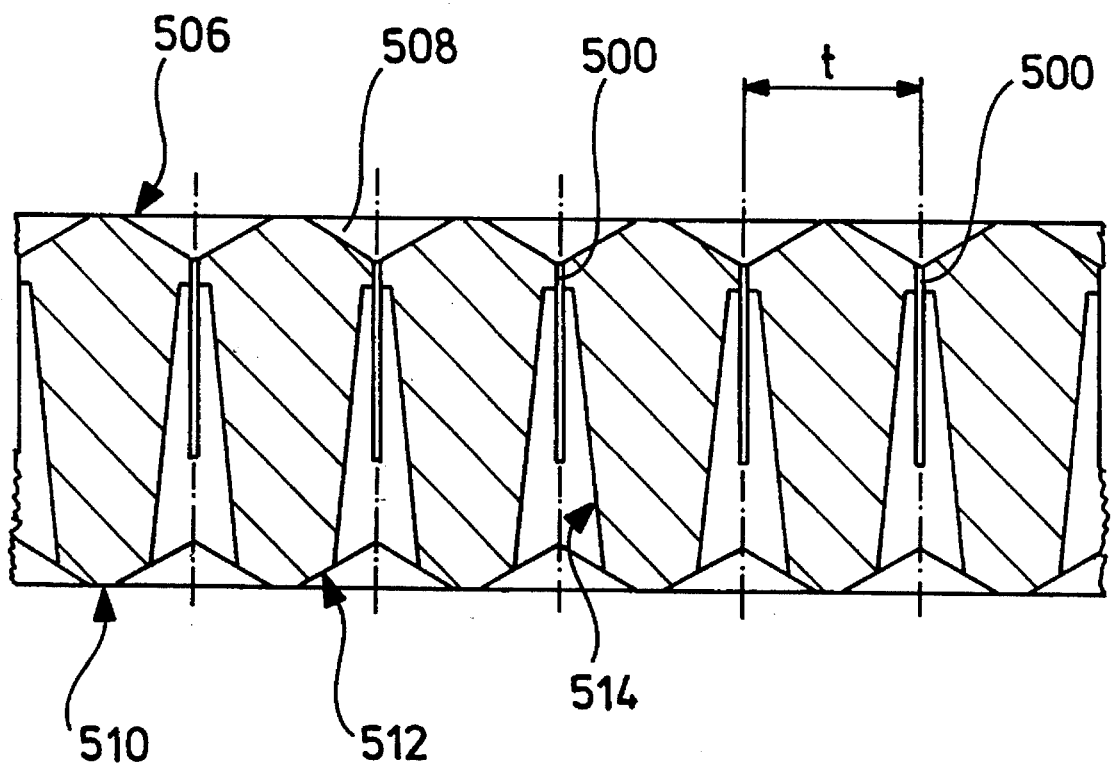
FIG. 12 is a section through part of the screen wall along the line 12—12 in FIG. 10.

An embodiment of the screen 38 illustrated in FIGS. 1–4 which is particularly recommended for the rotor illustrated in FIGS. 6–8 is one which has an internal diameter of approximately 410 mm, an axial length measured in the direction of the axis 34 of approximately 505 mm and has slot-shaped screen through channels which are arranged and dimensioned such that the inside cross section of each slot, seen in radial direction in relation to the axis 34, has a width of approximately 0.1 mm to approximately 0.25 mm and a length of approximately 35 mm to approximately 50 mm, whereby the slots extend at least approximately parallel to the screen axis 34 and have a distance "t" from one another measured in the rotational direction U, i.e., in the circumferential direction of the screen, which is approximately 3.2 mm to approximately 4 mm (measured each time from slot center; see also FIG. 12 to slot center).

As indicated in FIG. 8, the outer circumference $C_r$ of the rotor casing 306 is approximately 1150 mm (with for use an internal diameter of the screen 38 of, as specified above, approximately 410 mm). The illustrated rotor casing 306 has an axial length $L_a$ of approximately 448 mm.

Finally, the wall thickness of the screen 38 is intended to be approximately 8 mm.

Figure 9:
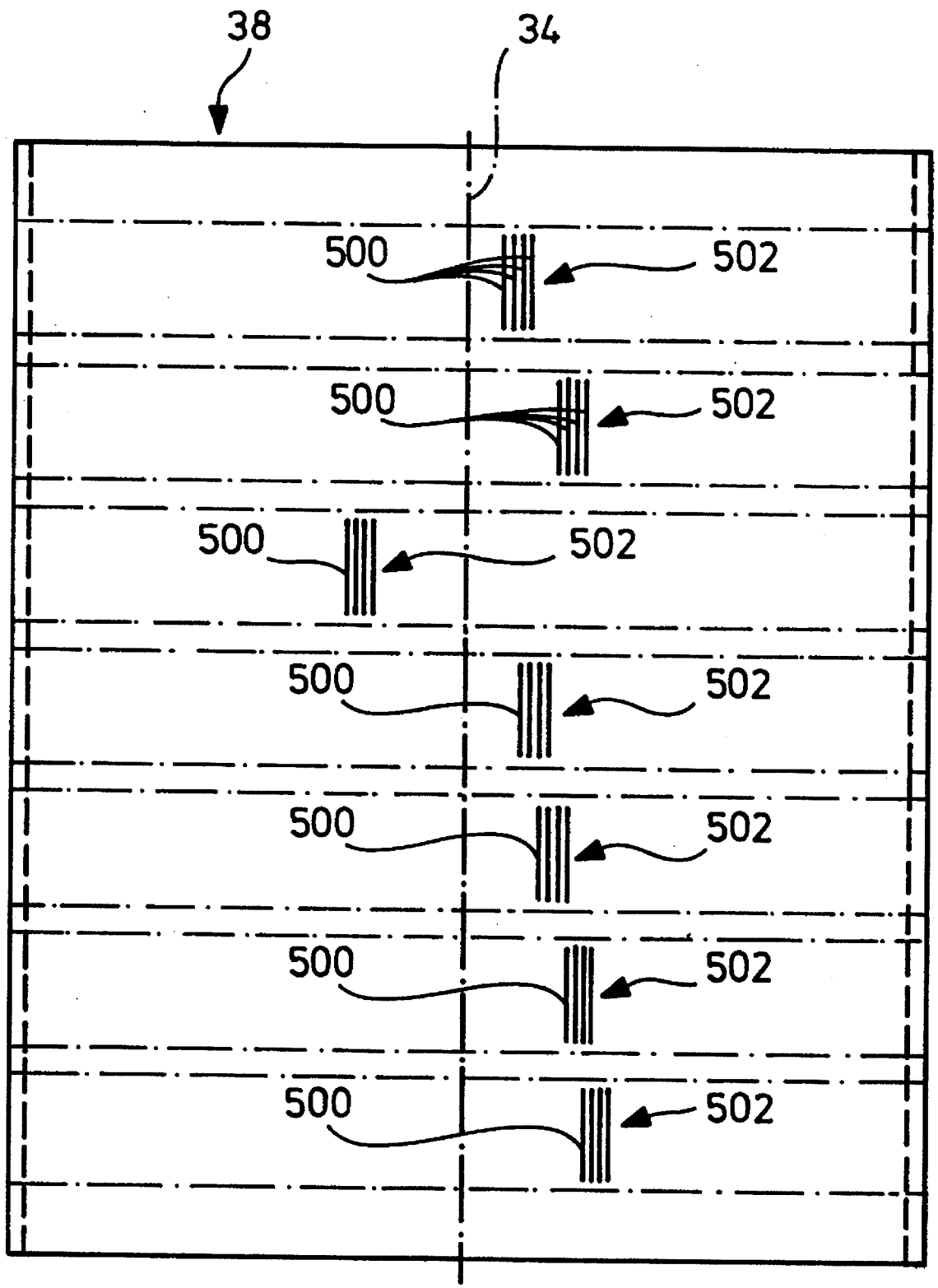
FIG. 9 is a schematic view of the screen of the pressure sorter, seen perpendicular to the screen axis, whereby the rows of slots have only been indicated.

The screen 38, which is illustrated in FIG. 9 in a side view, i.e. in a view perpendicular to the screen axis 34, and the shape of which corresponds to a hollow, circular cylinder concentric to the axis 34, has screen openings with slot-shaped through channels 500, of which only a few are illustrated in FIG. 9. The slot-shaped through channels 500 form in the screen 38 altogether seven rows 502 of slots, each of which extends around the entire screen circumference and concentrically to the screen axis 34. (For the sake of simplicity, the rows 502 of slots have been represented in FIG. 9 only by dash-dot lines.) This results in the fact that the rows 502 of slots are arranged at equal distances from one another in the direction of the screen axis 34. The length of the slot-shaped through channels 500 measured in the direction of the screen axis 34 and the number of rows 502 of slots are intended to be selected, for the screen 38 illustrated in FIGS. 9–12, such that only about 50% of the screen wall surface and, therefore, of the surface area on the inflow side of the screen 38 is provided with through channels 500 or rows 502 of slots.

Figure 10:
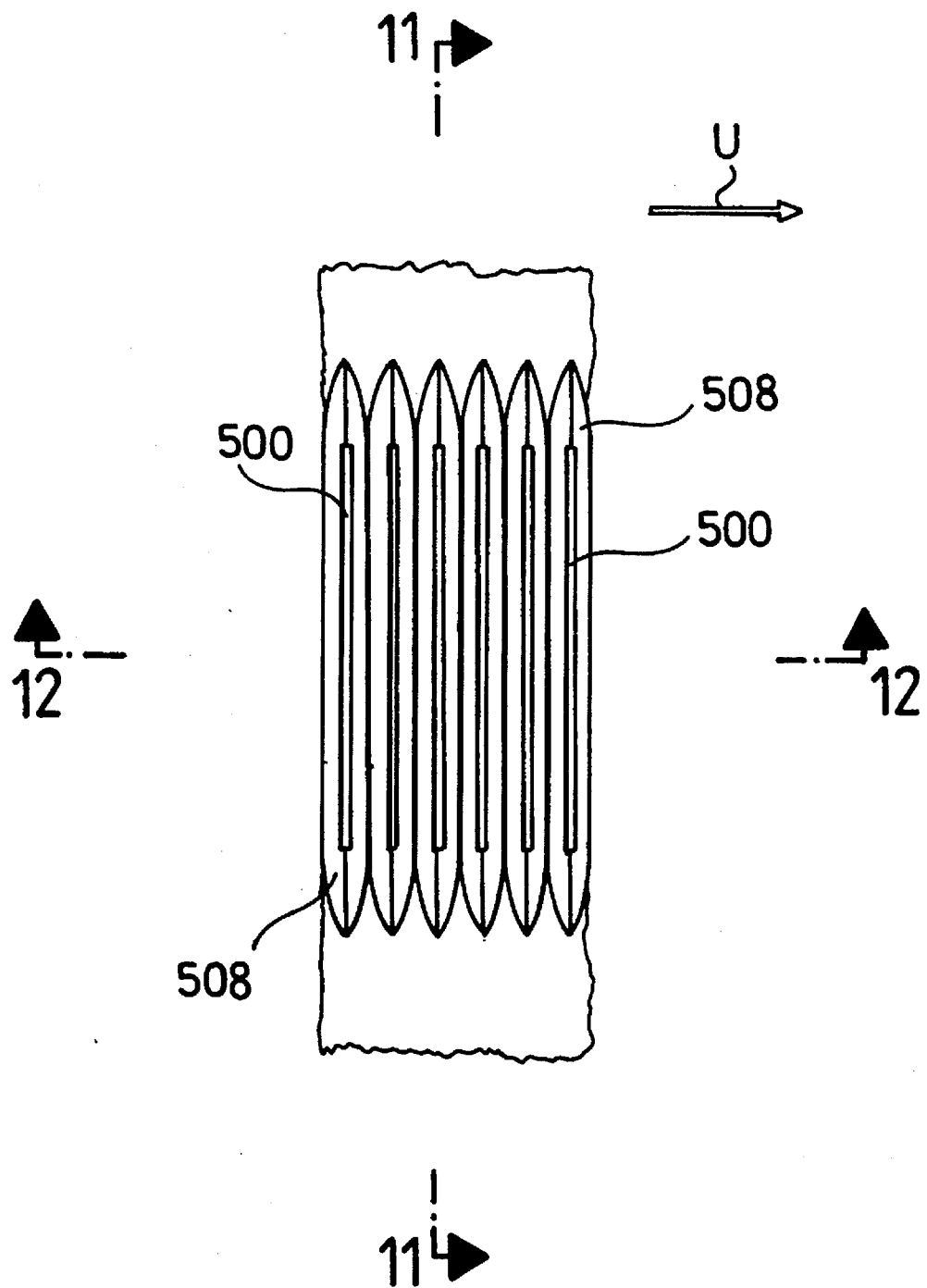
FIG. 10 is an enlarged view of part of the inflow side of the screen, seen perpendicular to the screen axis.
Figure 11:
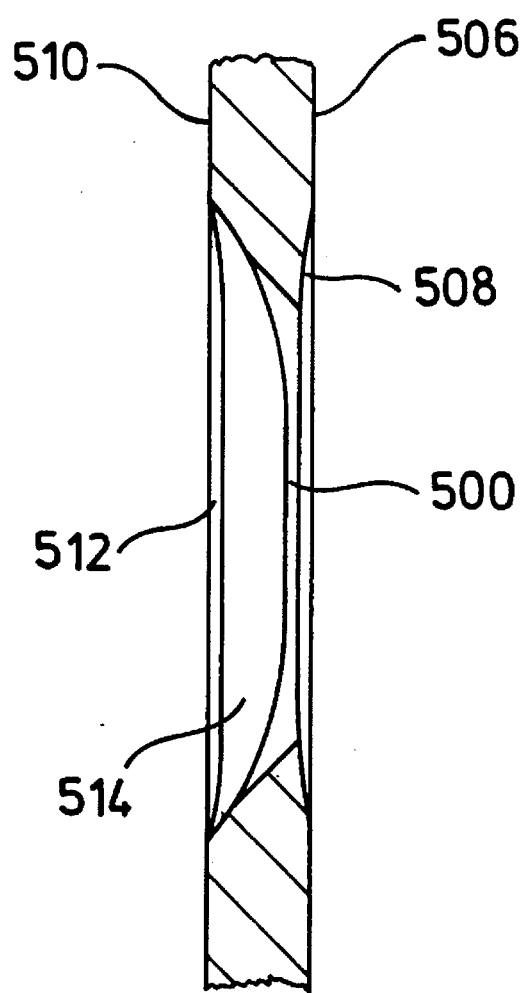
FIG. 11 is a section through part of the screen wall along the line 11—11 in FIG. 10.

FIGS. 10–12 show that in this embodiment of the screen 38 each screen opening is formed by four components: At the inflow side 506 forming the inner circumferential surface of the screen 38 illustrated in FIG. 9 the screen has for each screen opening a groove 508 with a V-shaped cross section (in the section perpendicular to the screen axis 34); in the same way, a groove 512 is provided for each screen opening at the outflow side 510 of the screen located opposite the inflow side 506 and the cross section of this groove is likewise V-shaped (again in the section perpendicular to the screen axis 34); this outer groove 512 is followed by an inner groove 514, and the slot-shaped through channel 500 which connects the groove 508 with the groove 514 is provided as a fourth component of each screen opening. Finally, the so-called spacing "t" of the screen is indicated in FIG. 12, i.e. the distance measured in circumferential direction of the screen between the centers of the slot-shaped through channels 500.

An example of the inventive process will now be described in the following, namely an example for the rotor according to FIGS. 6 and 8 in conjunction with the screen illustrated in FIGS. 9–12.

Since, in this case, through channels 500 or rows 502 of slots of the screen 38 are located opposite only approximately 50% of each profiled element 308 (measured in the direction of the screen axis 34), the sum $F_f$ of the sections of the surface area of the three first flanks I which are located opposite the slots is, in the rotor 300 according to FIGS. 6–8, approximately 114 cm² namely 0.5×3×44.8 cm×17 cm. If a volume of 4,570 liters/min of fiber suspension to be treated is supplied per minute to the pressure sorter provided with this rotor and this screen, and 20% thereof cannot pass through the screen, i.e. leaves the pressure sorter as so-called rejected material, the accepts volume discharged at its accepts outlet per minute is 3,656 liters/min. With a wall thickness of the screen 38 of 8 mm, this results in a value of 32 liters/min per cm² for the ratio of the accepts volume discharged per minute to the sum $F_f$ of the surface area (the factor D/8 is in this case equal to 1.0).

All the aforementioned embodiments apply to screens made of the austenitic stainless steels customary for screens of this type. If the screen material is a steel which has a greater strength than the austenitic stainless steels mentioned above, the maximum allowable suspension volume per profiled element increases at least approximately proportionately to the ratio of the strength of this stronger steel to the strength of the specified austenitic stainless steels.

What is claimed is:

1. A pressure sorter for fiber suspensions, comprising a housing, a screen mounted in a stationary position within said housing and being of a configuration which is rotationally symmetrical to a screen axis, said screen having a wall thickness of approximately 6 mm to approximately 9 mm, said screen separating a supply chamber encircled by the screen from an accepts chamber located outside the screen, wherein an inflow side of the screen faces the supply chamber and the supply chamber and the accepts chamber communicate with one another via through channels located in the screen wall, wherein the through channels, when viewed radially from the supply chamber, are slots approximately parallel to the screen axis, said slots having the same length as well as each having a clear slot width measured in the circumferential direction of the screen of approximately 0.1 mm to approximately 0.25 mm and forming in the screen wall a plurality of rows of slots with each row extending in the circumferential direction of the screen and the rows being arranged in spaced relation to one another in the direction of the screen axis, and wherein the inflow side of the screen includes contours generating turbulences in the fiber suspension to be treated, a rotor within said supply chamber and rotatable about the screen axis, an inlet for the fiber suspension to be treated communicating with a first axial end of the supply chamber, an accepts outlet communicating with the accepts chamber and a rejects outlet communicating with a second axial end of the supply chamber, wherein for generating positive and negative pressure pulses in the fiber suspension to be treated the rotor has a plurality of profiled elements arranged in the supply chamber and following one another in the circumferential direction of the rotor, said profiled elements each having a first flank lying in front in the rotational direction as well as approximately parallel to the screen axis for driving the fiber suspension to be treated in the rotational direction of the rotor as well as a second flank lying behind the first flank in a direction opposite to the rotational direction for drawing liquid back from the accepts chamber through the screen and into the supply chamber, wherein said rotor has such a number of profiled elements that the accepts volume $V_{Gmax}$ (in liters) drawn off per minute at the accepts outlet of the pressure sorter during its operation does not exceed approximately $$V_{Gmax}=32 \times F_f \times D/8$$

where D means the screen wall thickness (in mm) and $F_f$ the sum of the surface area (in cm²), measured perpendicular to the circumferential direction of the rotor, of those sections of the first flanks of all the profiled elements located opposite the rows of slots in a radial direction in relation to the screen axis.

2. The invention as in claim 1 wherein the number and configuration of said profiled elements and the thickness of said screen are such that the ratio $V_{Gmax}/F_f$ divided by the value D/8 is between approximately 20 and approximately 28.

3. The invention as in claim 2 wherein the sum of the clear slot area of all of said slots is between approximately 1% and approximately 10% of the surface area of the inflow side of the screen.

4. The invention as in claim 1 wherein the sum of the clear slot area of all of said slots is between approximately 1% and approximately 10% of the surface area of the inflow side of the screen.

5. The invention as in claim 4 wherein each of said slots is of a width measured circumferentially of said rotor of between approximately 0.1 mm and approximately 0.25 mm.

6. The invention as in claim 1 wherein each of said slots is of a width measured circumferentially of said rotor of between approximately 0.1 mm and approximately 0.25 mm.

7. The invention as in claim 1 wherein each of the profiled elements is of the same length measured in the circumferential direction of the rotor and said length plus the length of any gap between each such profiled element and the following profiled element in the circumferential direction is between approximately 0.2 and approximately 1.0 times the diameter defined by the edges of the profiled elements lying closest to the rotor axis.

8. The invention as in claim 1 wherein the length of each of said second flanks measured in the rotational direction of the rotor is between approximately 10 and approximately 25 times the height of that profiled element measured in a radial direction relative to the screen axis.

9. A pressure sorter for fiber suspensions, comprising a housing, a screen mounted in a stationary position within said housing and being of a configuration which is rotationally symmetrical to a screen axis, said screen having a wall thickness of approximately 6 mm to approximately 9 mm, said screen separating a supply chamber encircled by the screen from an accepts chamber located outside the screen, wherein an inflow side of the screen faces the supply chamber and the supply chamber and the accepts chamber communicate with one another via through channels located in the screen wall, wherein the through channels, when viewed radially from the supply chamber, are slots approximately parallel to the screen axis, said slots having the same length as well as each having a clear slot width measured in the circumferential direction of the screen of approximately 0.1 mm to approximately 0.25 mm and forming in the screen wall a plurality of rows of slots with each row extending in the circumferential direction of the screen and the rows being arranged in spaced relation to one another in the direction of the screen axis, and wherein the inflow side of the screen includes contours generating turbulences in the fiber suspension to be treated, a rotor within said supply chamber and rotatable about the screen axis, an inlet for the fiber suspension to be treated communicating with a first axial end of the supply chamber, an accepts outlet communicating with the accepts chamber and a rejects outlet communicating with a second axial end of the supply chamber, wherein for generating positive and negative pressure pulses in the fiber suspension to be treated the rotor has a plurality of profiled elements arranged in the supply chamber and following one another in the circumferential direction of the rotor, said profiled elements each having a first flank lying in front in the rotational direction as well as approximately parallel to the screen axis for driving the fiber suspension to be treated in the rotational direction of the rotor as well as a second flank lying behind the first flank in a direction opposite to the rotational direction for drawing liquid back from the accepts chamber through the screen and into the supply chamber, wherein said rotor has such a number of profiled elements that the volume $V_{Smax}$ (in liters) of fiber suspension to be treated supplied per minute to the pressure sorter via its inlet during its operation does not exceed approximately $$V_{Smax} = 50 \times F_f D/8$$

where D means the screen wall thickness (in mm) and $F_f$ the sum of the surface area (in cm$^2$), measured perpendicular to the circumferential direction of the rotor, of those sections of the first flanks of all the profiled elements located opposite the rows of slots in a radial direction in relation to the screen axis.

10. The invention as in claim 9 wherein the number and configuration of said profiled elements and the thickness of said screen are such that the ratio $V_{Smax}/F_f$ divided by the value D/8 is between approximately 30 and approximately 50.

11. The invention as in claim 10 wherein the sum of the clear slot area of all of said slots is between approximately 1% and approximately 10% of the surface area of the inflow side of the screen.

12. The invention as in claim 9 wherein the sum of the clear slot area of all of said slots is between approximately 1% and approximately 10% of the surface area of the inflow side of the screen.

13. The invention as in claim 12 wherein each of said slots is of a width measured circumferentially of said rotor of between approximately 0.1 mm and approximately 0.25 mm.

14. The invention as in claim 9 wherein each of said slots is of a width measured circumferentially of said rotor of between approximately 0.1 mm and approximately 0.25 mm.

15. The invention as in claim 9 wherein each of the profiled elements is of the same length measured in the circumferential direction of the rotor and said length plus the length of any gap between each such profiled element and the following profiled element in the circumferential direction is between approximately 0.2 and approximately 1.0 times the diameter defined by the edges of the profiled elements lying closest to the rotor axis.

16. The invention as in claim 9 wherein the length of each of said second flanks measured in the rotational direction of the rotor is between approximately 10 and approximately 25 times the height of that profiled element measured in a radial direction relative to the screen axis.

17. A process for the preparation of fiber suspensions comprising the steps of:

providing a pressure sorter which includes a housing, a screen mounted in a stationary position within said housing and being of a configuration which is rotationally symmetrical to a screen axis, said screen having a wall thickness of approximately 6 mm to approximately 9 mm, said screen separating a supply chamber encircled by the screen from an accepts chamber located outside the screen, wherein an inflow side of the screen faces the supply chamber and the supply chamber and the accepts chamber communicate with one another via through channels located in the screen wall, wherein the through channels, when viewed radially from the supply chamber, are slots approximately parallel to the screen axis, said slots having the same length as well as each having a clear slot width measured in the circumferential direction of the screen of approximately 0.1 mm to approximately 0.25 mm and forming in the screen wall a plurality of rows of slots with each row extending in the circumferential direction of the screen and the rows being arranged in spaced relation to one another in the direction of the screen axis, and wherein the inflow side of the screen includes contours generating turbulences in the fiber suspension to be treated, a rotor within said supply chamber and rotatable in a first direction about the screen axis, an inlet for the fiber suspension to be treated communicating with a first axial end of the supply chamber, an accepts outlet communicating with the accepts chamber and a rejects outlet communicating with a second axial end of the supply chamber, wherein the rotor has a plurality of profiled elements arranged in the supply chamber and following one another in the circumferential direction of the rotor, said profiled elements each having a first flank lying in front in the rotational direction as well as approximately parallel to the screen axis for driving the fiber suspension to be treated in the rotational direction of the rotor as well as a second flank lying behind the first flank in a direction opposite to the rotational direction for drawing liquid back from the accepts chamber through the screen and into the supply chamber, supplying a fiber suspension to said supply chamber while rotating said rotor in said first direction, thereby driving said suspension in said one rotational direction and creating positive and negative pressure pulses in the fiber suspension adjacent said inflow side of said screen by the movement of said profiled elements for alternately moving such suspension through the screen into the accepts chamber and drawing liquid back from the accepts chamber through the screen into the supply chamber, drawing off material from the accepts outlet, and removing material from said rejects outlet, wherein the amount of fiber suspension supplied to the pressure sorter per minute for treatment is such that the accepts volume $V_{Gmax}$ (in liters) drawn off per minute from the accepts chamber does not exceed approximately $$V_{Gmax} = 32 \times F_f \times D/8$$

where D means the screen wall thickness (in mm) and $F_f$ the sum of the surface area (in cm$^2$), measured perpendicular to the circumferential direction of the rotor, of those sections of the first flanks of all the profiled elements located opposite the rows of slots in a radial direction in relation to the screen axis.

18. The invention as in claim 17 wherein the volume of fiber suspension processed through the pressure sorter per minute and the number and configuration of said profiled elements and the thickness of the screen are correlated such that the ratio $V_{Gmax}/F_f$ divided by the value D/8 is between approximately 20 and approximately 28.

19. A process for the preparation of fiber suspensions comprising the steps of:

providing a pressure sorter which includes a housing, a screen mounted in a stationary position within said housing and being of a configuration which is rotationally symmetrical to a screen axis, said screen having a wall thickness of approximately 6 mm to approximately 9 mm, said screen separating a supply chamber encircled by the screen from an accepts chamber located outside the screen, wherein an inflow side of the screen faces the supply chamber and the supply chamber and the accepts chamber communicate with one another via through channels located in the screen wall, wherein the through channels, when viewed radially from the supply chamber, are slots approximately parallel to the screen axis, said slots having the same length as well as each having a clear slot width measured in the circumferential direction of the screen of approximately 0.1 mm to approximately 0.25 mm and forming in the screen wall a plurality of rows of slots with each row extending in the circumferential direction of the screen and the rows being arranged in spaced relation to one another in the direction of the screen axis, and wherein the inflow side of the screen includes contours generating turbulences in the fiber suspension to be treated, a rotor within said supply chamber and rotatable in a first direction about the screen axis, an inlet for the fiber suspension to be treated communicating with a first axial end of the supply chamber, an accepts outlet communicating with the accepts chamber and a rejects outlet communicating with a second axial end of the supply chamber, wherein the rotor has a plurality of profiled elements arranged in the supply chamber and following one another in the circumferential direction of the rotor, said profiled elements each having a first flank lying in front in the rotational direction as well as approximately parallel to the screen axis for driving the fiber suspension to be treated in the rotational direction of the rotor as well as a second flank lying behind the first flank in a direction opposite to the rotational direction for drawing liquid back from the accepts chamber through the screen and into the supply chamber, supplying a fiber suspension to said supply chamber while rotating said rotor in said first direction, thereby driving said suspension in said one rotational direction and creating positive and negative pressure pulses in the fiber suspension adjacent said inflow side of said screen by the movement of said profiled elements for alternately moving such suspension through the screen into the accepts chamber and drawing liquid back from the accepts chamber through the screen into the supply chamber, drawing off material from the accepts outlet, and removing material from said rejects outlet, wherein the volume $V_{Smax}$ (in liters) of fiber suspension supplied to the pressure sorter per minute for treatment does not exceed approximately $$V_{Smax} = 32 \times F_f \times D/8$$

where D means the screen wall thickness (in mm) and $F_f$ the sum of the surface area (in cm$^2$), measured perpendicular to the circumferential direction of the rotor, of those sections of the first flanks of all the profiled elements located opposite the rows of slots in a radial direction in relation to the screen axis.

20. The invention as in claim 19 wherein the volume of fiber suspension supplied to the pressure sorter per minute and the number and configuration of said profiled elements and the thickness of the screen are correlated such that the ratio $V_{Smax}/F_f$ divided by the value D/8 is between approximately 30 and approximately 50.

* * * * *